(12) United States Patent  (10) Patent No.: US 9,026,714 B2
Peterson et al.  (45) Date of Patent: May 5, 2015

(54) MEMORY EXPANSION USING RANK AGGREGATION

(75) Inventors: Jay Evan Scott Peterson, Sunnyvale, CA (US); Philip Manela, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1005 days.

(21) Appl. No.: 12/802,314

(22) Filed: Jun. 4, 2010

(65) Prior Publication Data

US 2011/0302366 A1    Dec. 8, 2011

(51) Int. Cl.
*G06F 12/00*    (2006.01)
*G06F 13/16*    (2006.01)
*G06F 12/06*    (2006.01)

(52) U.S. Cl.
CPC ........ *G06F 13/1668* (2013.01); *G06F 12/0623* (2013.01)

(58) Field of Classification Search
USPC ................................ 711/5, 105, 202, E12.001
See application file for complete search history.

(56) References Cited

U.S. PATENT DOCUMENTS

| 7,133,960 | B1 * | 11/2006 | Thompson et al. ................ 711/5 |
| 2007/0156948 | A1 * | 7/2007 | Nakanishi et al. ................ 711/5 |
| 2008/0068900 | A1 | 3/2008 | Bhakta et al. |
| 2009/0094412 | A1 | 4/2009 | Markevitch |
| 2009/0177849 | A1 | 7/2009 | Mazzola et al. |
| 2009/0177853 | A1 | 7/2009 | Mazzola et al. |
| 2009/0177861 | A1 * | 7/2009 | Mazzola et al. ............... 711/202 |

* cited by examiner

*Primary Examiner* — Yong Choe
(74) *Attorney, Agent, or Firm* — Cindy Kaplan

(57) ABSTRACT

In one embodiment, a method includes receiving from a memory controller, a request to access memory stored at memory modules, the request directed to one of a plurality of logical ranks, mapping at a rank aggregator, the logical rank to one of a plurality of physical ranks at the memory modules, and forwarding the request to one of the memory modules according to the mapping. Two or more of the memory modules are combined to represent the number of logical ranks at the memory controller such that there is a one-to-one mapping between the logical ranks and the physical ranks. An apparatus for rank aggregation is also disclosed.

18 Claims, 4 Drawing Sheets

MEMORY EXPANSION USING RANK AGGREGATION

TECHNICAL FIELD

The present disclosure relates generally to computers, and more particularly, to computer memory.

BACKGROUND

The memory capacity requirements of computers, and in particular servers, are increasing rapidly due to increasing workloads. Examples include the increase in popularity of virtualization, which oversubscribes the computer's physical memory among multiple users, and the increasing amount of data stored and computed by a server, which requires more memory to avoid accessing disks. Expanded memory without a reduction in system performance is desired.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
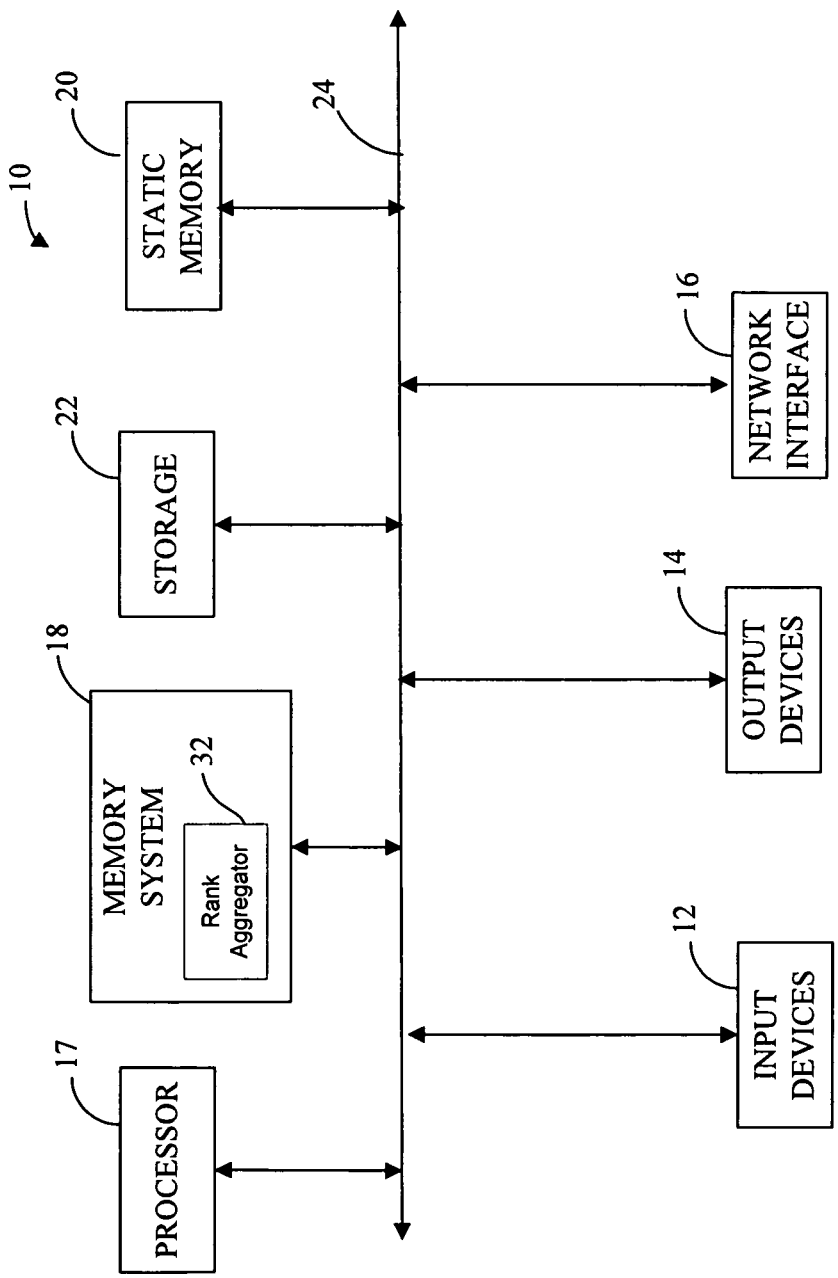
FIG. 1 illustrates an example of a computer system in which embodiments described herein may be implemented.

In one embodiment, a method generally comprises receiving from a memory controller, a request to access memory stored at memory modules, the request directed to one of a plurality of logical ranks, mapping at a rank aggregator, the logical rank to one of a plurality of physical ranks at the memory modules, and forwarding the request to one of the memory modules according to the mapping. Two or more of the memory modules are combined to represent the number of logical ranks at the memory controller such that there is a one-to-one mapping between the logical ranks and the physical ranks.

In another embodiment, an apparatus generally comprises a rank aggregator for receiving from a memory controller, a request to access memory stored at memory modules, the request directed to one of a plurality of logical ranks, mapping the logical rank to one of a plurality of physical ranks at the memory modules, and forwarding the request to one of the memory modules according to the mapping. Two or more of the memory modules are combined to represent the number of logical ranks at the memory controller such that there is a one-to-one mapping between the logical ranks and the physical ranks. The apparatus further includes interfaces for communication with the memory controller and the memory modules.

In yet another embodiment, an apparatus generally comprises memory modules comprising a plurality of physical ranks, a memory controller for transmitting a request to access memory at the memory modules, the request directed to one of a plurality of logical ranks, and a rank aggregator for mapping the logical rank to one of the physical ranks, and forwarding the request to one of the memory modules according to the mapping. Two or more of the memory modules are combined to represent the number of logical ranks at the memory controller such that there is a one-to-one mapping between the logical ranks and the physical ranks.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein provide expanded memory using rank aggregation. The following describes an overview of how DRAM (Dynamic Random Address Memory) is addressed and accessed with conventional systems, and how this changes with rank multiplication, and with rank aggregation.

DRAMs are addressed using chip select (CS), bank address (BA), row address, and column address bits. Bank, row, and column address bits select a location within a rank of DRAMs. CS lines select the desired rank. Increases in device density can be accommodated by adding additional row or column bits, or by adding additional banks. In conventional systems, each doubling in density involves the addition of one row address bit. The number of banks, column bits, and page size remains fixed for all Double Data Rate 3 (DDR3) densities at a particular width.

The DRAMs may be located on a Dual Inline Memory Module (DIMM). The terms logical DIMM (LDIMM) and physical DIMM (PDIMM) are used herein. A logical DIMM is what the memory controller believes to be the memory system's configuration in terms of the number of ranks, banks, row bits, and column bits. The memory controller generates memory accesses based on this model. The logical and physical DIMMs are described in detail below with respect to FIGS. 2 and 3.

Rank multiplication emulates one logical rank of higher density DRAMs using two or four physical ranks of less dense DRAMs. This emulation is enabled by using the larger number of row bits to decode additional chip selects. An example of rank multiplication is described in U.S. Patent Application Publication No. 2009/0177853, published Jul. 9, 2009.

Rank multiplication provides two or more physical DRAM devices behind the same logical rank. As the host streams within a logical rank, it has no knowledge of which physical DRAM device it is accessing. Subsequent stream accesses may therefore be split across two devices; with the first access sent on one device and the second access sent to the other device immediately following the first transaction. Stream accesses to a single DRAM are optimized so that only the first access of a stream generates a preamble. This means that within a stream, there is no temporal gap allotted for a second preamble. This causes data bus contention, as the second device's preamble overlaps with the first device's sourcesynchronous data clock. To ensure that such a collision does not occur, it is assumed that every stream access needs to provide the temporal gap needed for a new preamble generated by switching DRAM devices. This gap is provided by increasing the minimum Column Access Strobe (CAS) to CAS from Burst Length (BL)/2 to (BL/2+2) cycles, where one cycle is used for the second device's preamble and the second cycle is used to handle DRAM device timing mismatches. Thus, the minimum CAS to CAS spacing for memory accesses on systems using rank multiplication increases from BL/2 cycles to (BL/2+2) cycles. This adds a two cycle 'bubble' to the data path, resulting in a 50% reduction in streaming performance when the burst length is eight.

The rank aggregation embodiments described herein provide expanded memory without a penalty to streaming accesses. In one embodiment, multiple physical ranks are combined into the largest number of logical ranks that a memory controller can schedule. This maintains a one-to-one mapping between the logical ranks in the memory controller and the physical ranks of memory. Rank aggregation thus eliminates the drawback discussed above with regard to rank multiplication and provides better stream performance than rank multiplication. As compared to conventional memory systems, rank aggregation allows for the logically maximum sized Dual Inline Memory Modules (DIMMs) by using lower ranked physical DIMMs. This provides a cost and memory size advantage. For example, using two smaller DIMMs to appear as a logically larger DIMM provides a less expensive solution than purchasing a single larger DIMM. Also, the embodiments make it possible to create a larger logical DIMM with multiple physical DIMMs than the maximum sized conventional physical DIMMs.

Referring now to the drawings, and first to FIG. 1, an example of a computer system 10 in which embodiments described herein may be implemented is shown. The computer system 10 may be, for example, a server, router, switch, or other network device. The computer system 10 may also be a personal computer, Personal Digital Assistant (PDA), or any other computing device.

The computer system 10 shown in FIG. 1 includes one or more input devices 12 (e.g., keyboard, mouse, tracking device, touch screen, or other device for interacting with a user interface), one or more output devices 14 (e.g., display, speakers), and network interface 16. The computer system 10 further includes subsystems such as processor 17 (e.g., central processing unit (CPU)), memory system 18, static memory 20, and storage 22. As described in detail below, the memory system 18 includes a memory controller, volatile memory, and a rank aggregator 32 for performing rank aggregation. The static or non-volatile memory 20 may store BIOS (Basic Input Output System) to act as an interface between system hardware and system software and initialize system hardware upon boot up of the computer system 10.

The storage 22 may include fixed storage (e.g., hard drive) and removable storage (e.g., CD-ROM drive). Logic may be encoded in one or more tangible media for execution by the processor 17. Memory 18 and storage 22 can be utilized to store and retrieve instructions and data structures (e.g., software). Computer storage media may also include DVDs or other optical storage, magnetic cassette, tape, or disk storage, or any other medium that can be used to store information which can be accessed by the computer.

The system bus architecture of computer system 10 is represented by arrows 24 in FIG. 1. However, these arrows are only illustrative of one possible interconnection scheme serving to link the subsystems. For example, a local bus could be utilized to connect the processor 17 to the memory system 18.

It is to be understood that the computer system shown in FIG. 1 is only one example of a computer system suitable for use with the embodiments and that other computer architectures having different configurations of subsystems may also be utilized without departing from the scope of the embodiments.

Figure 2:
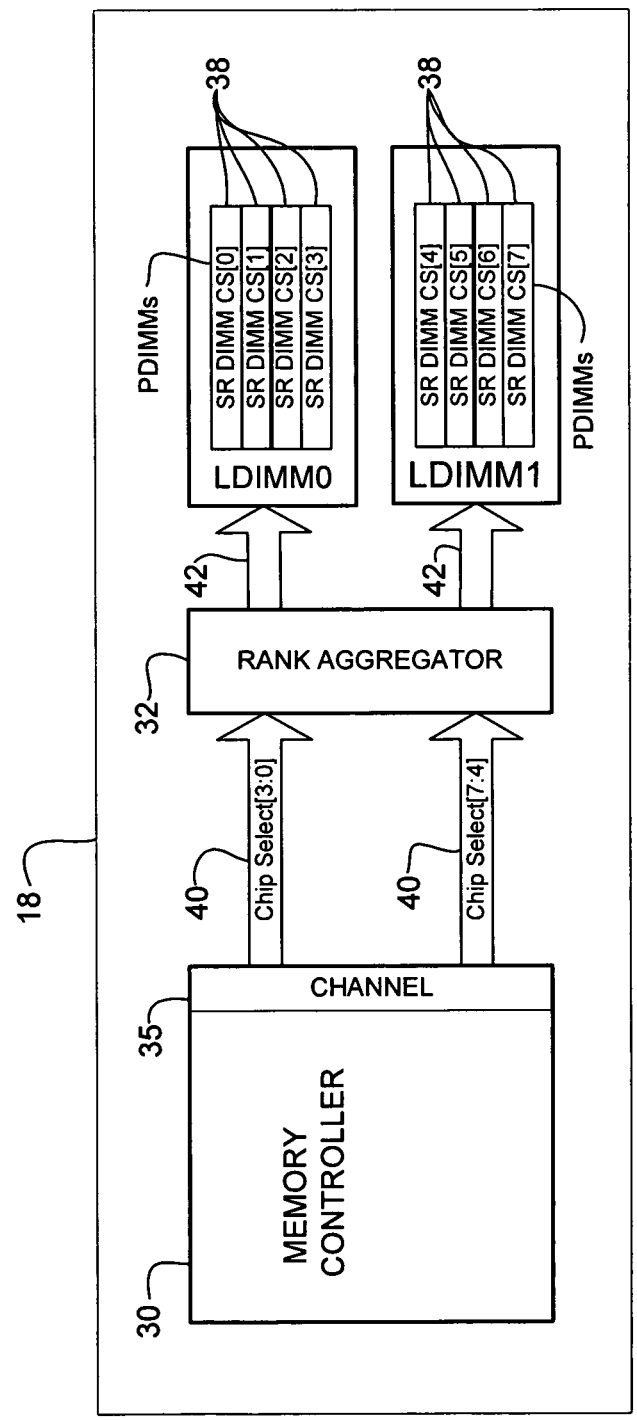
FIG. 2 is a block diagram of a memory system for use in the computer system of FIG. 1, in accordance with one embodiment.

FIG. 2 is a block diagram of the memory system 18, in accordance with one embodiment. The memory system 18 includes memory controller 30, rank aggregator 32, and memory modules 38. The memory controller 30 is coupled to the processor 17 (shown in FIG. 1). The processor 17 may access instructions that are stored within the memory modules 38 and process the instructions in connection with operation of the computer system 10 of FIG. 1. The memory modules 38 may store instructions or any other software code, records, or other data accessed by the processor 17, or by applications or operating systems running on the computer system 10.

The memory controller 30 may receive requests from the processor 17 to access the memory modules 38. Communications between the processor 17 and the memory controller 30 may be made using a communication protocol, as is well known by those skilled in the art. The memory controller 30 may receive a memory access request from the processor 17 by way of one communication protocol and use a different communication protocol (e.g., DDR) to communicate the request to the rank aggregator 32 over a communication channel 35.

In the example shown in FIG. 2, the memory controller 30 interfaces with the rank aggregator 32 at channel 40. In one embodiment, channel 40 is logically subdivided and the rank aggregator 32 uses the logical subdivision to correspond to two logical DIMMs (LDIMM0, LDIMM1). Each logical subdivision of the channel 40 includes four chip selects (0→3 and 4→7). The memory modules include interfaces 42 to accommodate memory access requests. Examples of memory accesses include activating a row of cells, reading or writing a memory cell, pre-charging a row of memory cells, refreshing a memory cell, or any other memory access operation.

In one embodiment, each memory module is a DIMM configured to host multiple memory devices (e.g., DRAMs). Each DIMM includes one or more sets of memory cells referred to as ranks. Each rank may include one or more banks of memory cells and each bank of memory cells includes an array of rows and columns, the intersection of which is the location and address of a memory cell.

In one embodiment, the rank aggregator 32 is an ASIC (Application Specific Integrated Circuit). The rank aggregator 32 provides command path logic and interacts with system clocking, as is well known by those skilled in the art. The command path logic provides address and command decode logic to generate chip selects, and data path steering logic. The rank aggregator 32 may also include configuration registers that allow a static mapping between the chip selects and the physical DIMMs to be changed during boot-time. In one embodiment, the rank aggregator 32 implements the address/control portion of the JEDEC (Joint Electron Devices Engineering Council) DDR3 protocol. The rank aggregator 32 includes the DDR3 interfaces 40 that communicate with the memory controller 30 and DIMM DDR3 interfaces 42 that communicate with the physical DIMMs. The rank aggregator 32 also includes memory for at least temporarily storing mappings between the logical ranks and the physical ranks.

Figure 3:
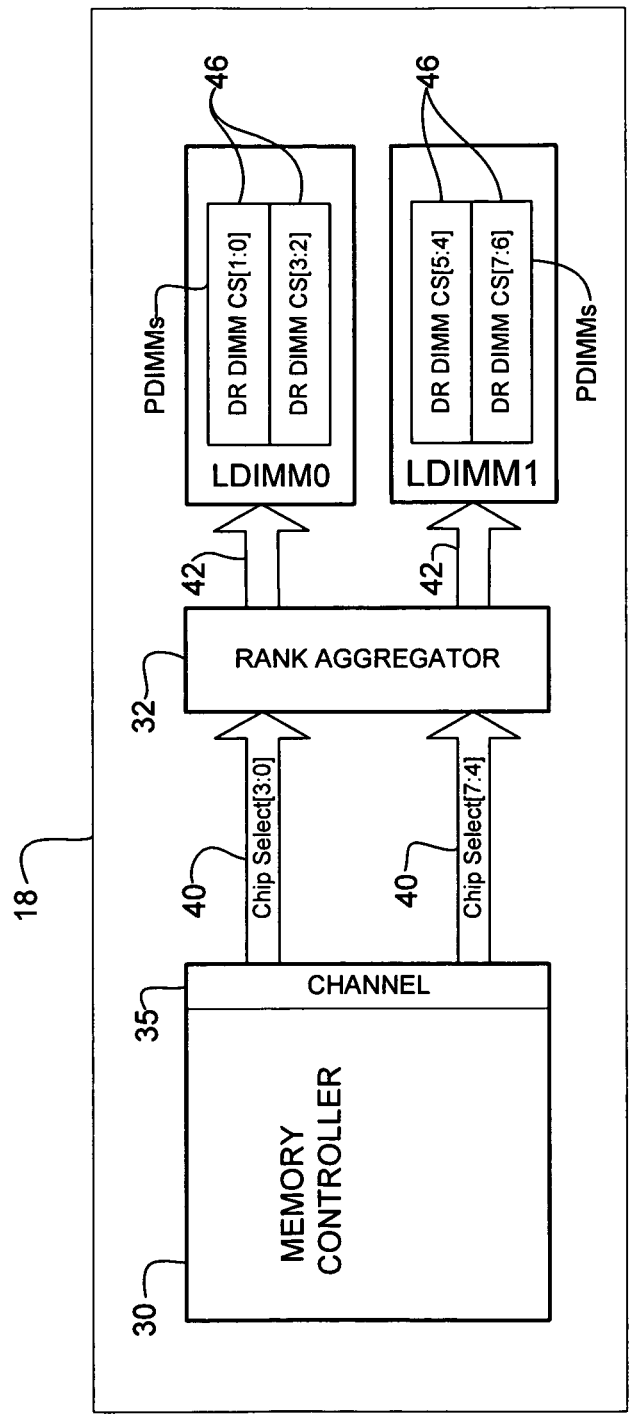
FIG. 3 is a block diagram of another memory system for use in the computer system of FIG. 1, in accordance with one embodiment.

In the examples shown in FIGS. 2 and 3, the memory system 18 is configured to support two logical DIMMS on one channel. FIG. 2 illustrates two logical DIMMs (DIMM0, DIMM1), each including four Single Rank (SR) DIMMs.

FIG. 3 illustrates rank aggregation with Dual Rank (DR) DIMMs. Each logical DIMM (DIMM0, DIMM1) in FIG. 3 includes two DR DIMMs 46. In these examples, rank aggregation is used to emulate a Quad Rank (QR) logical DIMM when four SR physical DIMMs (FIG. 2) or two DR physical DIMMs (FIG. 3) are inserted.

If the memory channel were populated with only one SR DIMM or DR DIMM, as in conventional systems, the memory controller's maximum number of physical ranks would be under used. Since the memory controller 30 is capable of addressing QR DIMMs, it is possible to masquerade two SR DIMMs as a single DR DIMM, four SR DIMMS as a single QR DIMM (FIG. 2), or two DR DIMMs as a single QR DIMM (FIG. 3). Rather than multiplying a logical rank into multiple physical ranks using upper address bits, as done for rank multiplication, rank aggregation combines multiple physical ranks into a larger logical rank representation, therefore maintaining a one-to-one mapping of logical rank to physical rank. Since a one-to-one relationship is maintained, each logical rank in the memory controller accesses a single physical rank of DRAM.

Rank aggregation allows for a flexible one-to-one mapping between logical chip selects and physical chip selects. This differs from rank multiplication, where the physical ranks need to be generated by the ASIC based on additional row bits. With rank aggregation, there is no need to use an upper address bit to split a logical chip select for multi-rank physical DIMMs. This increases performance as the memory controller is in full control of the physical DIMMs, rather than having an uncertainty of which physical DIMM is being targeted.

Table I below lists configurations and the processor chip select outputs for a two logical DIMMs per channel, up to eight rank memory system. In this example, CS0 through CS3 connect to logical DIMM0, and CS4 through CS7 connect to logical DIMM1. Logical configuration number 12 in Table I corresponds to the examples shown in FIGS. 2 and 3.

TABLE I

| Logical Config. | Logical DIMM1 | Logical DIMM0 | CS7 | CS6 | CS5 | CS4 | CS3 | CS2 | CS1 | CS0 |
|---|---|---|---|---|---|---|---|---|---|---|
| 1 | EMPTY | SR | — | — | — | — | — | — | — | X |
| 2 | EMPTY | DR | — | — | — | — | — | — | X | X |
| 3 | EMPTY | QR | — | — | — | — | X | X | X | X |
| 4 | SR | SR | — | — | — | X | — | — | — | X |
| 5 | SR | DR | — | — | — | X | — | — | X | X |
| 6 | DR | SR | — | — | X | X | — | — | — | X |
| 7 | DR | DR | — | — | X | X | — | — | X | X |
| 8 | SR | QR | — | — | — | X | X | X | X | X |
| 9 | QR | SR | X | X | X | X | — | — | — | X |
| 10 | DR | QR | — | — | X | X | X | X | X | X |
| 11 | QR | DR | X | X | X | X | — | — | X | X |
| 12 | QR | QR | X | X | X | X | X | X | X | X |

Table II below lists examples of physical DIMM loading and how the logical ranks are assigned to the physical DIMMs when using rank aggregation.

TABLE II

| Config. | Logical DIMM1 | Logical DIMM0 | 7 | 6 | 5 | 4 | 3 | 2 | 1 | 0 |
|---|---|---|---|---|---|---|---|---|---|---|
| 1 | empty | SR | | | | | | | | SR |
| 2 | empty | DR | | | | | | | SR | SR |
| 3 | SR | SR | | | | SR | | | | SR |
| 4 | DR | DR | | | SR | SR | | | SR | SR |
| 5 | empty | DR | | | | | | | | DR |
| 6 | empty | QR | | | | | | | DR | DR |
| 7 | DR | DR | | | | DR | | | | DR |
| 8 | empty | QR | | | | | | | | QR |
| 9 | QR | QR | | | DR | DR | | | DR | DR |
| 10 | QR | QR | | | | QR | | | | QR |
| 11 | empty | QR | | | | | SR | SR | SR | SR |
| 12 | QR | QR | SR | SR | SR | SR | SR | SR | SR | SR |

The examples shown in Table II are for a two logical DIMMs, eight physical ranks memory system. Table II only shows examples where all physical DIMMs have the same organization. The memory system may also be configured with different rank logical DIMMs or physical DIMMs. Configuration number 12 in Table II corresponds to the layout shown in FIG. 2. Configuration number 9 in Table II corresponds to the layout shown in FIG. 3.

It is to be understood that the memory systems 18 shown in FIGS. 2 and 3 are only examples and that changes may be made without departing from the scope of the embodiments. The memory system may include multiple channels, a different number of logical DIMMs, physical DIMMs, or ranks (or chip selects). For example, the memory system may support two logical DIMMs, each logical DIMM comprising two physical DIMMs to provide up to an eight rank memory system. In this example, each logical DIMM can include up to two SR DIMMs, two DR DIMMs, or one QR DIMM.

Figure 4:
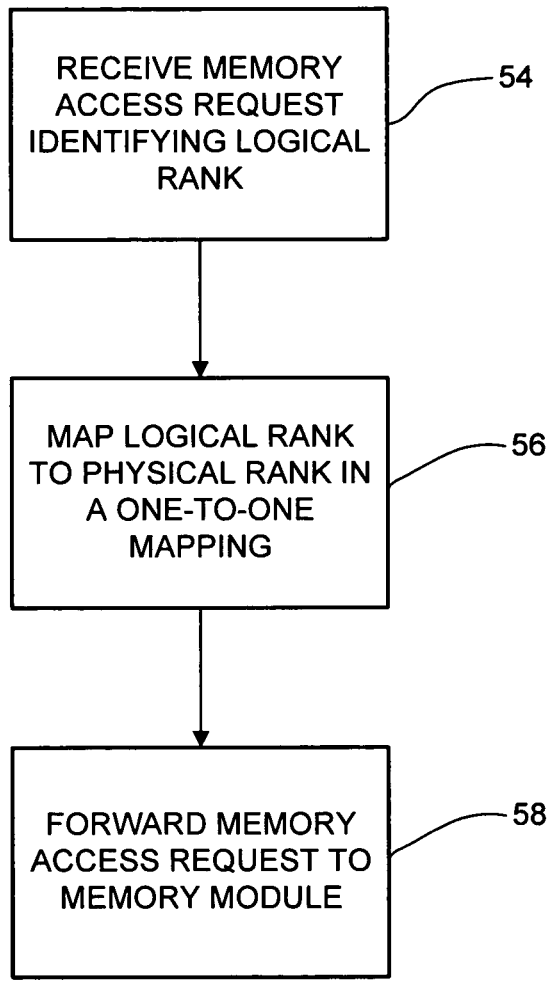
FIG. 4 is a flowchart illustrating a process for rank aggregation in the memory systems of FIGS. 2 and 3, in accordance with one embodiment.

FIG. 4 is a flowchart illustrating a process for memory expansion using rank aggregation, in accordance with one embodiment. At step 54, the rank aggregator 32 receives a memory access request identifying a logical rank. The memory request is received from the memory controller 30 over the DDR channel 35 (FIG. 1). The memory request may include, for example, a memory address and a read or write command. The memory address may identify a location of a set of memory cells (e.g., bank, row, and column address located within a rank). The rank aggregator 32 maps the logical rank to a physical rank (step 56). Two or more of the memory modules 38, 46 are combined to represent the number of logical ranks at the memory controller 30 so that there is a one-to-one mapping between the logical ranks and the physical ranks. The mapping of the logical ranks to the physical ranks may be performed during boot up, for example. The rank aggregator 32 forwards the memory request to the memory module in accordance with the mapping (step 58).

It is to be understood that the process illustrated in FIG. 4 is only an example and that steps may be changed, removed, or added without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving from a memory controller, a request to access memory stored at memory modules, said request directed to one of a plurality of logical ranks and comprising a read or write command, and a memory address identifying a location of a set of memory cells, two or more of the memory modules combined to represent the number of logical ranks at the memory controller;
mapping at a rank aggregator, said logical rank to one of a plurality of physical ranks at the memory modules, wherein said physical ranks are combined into a largest number of said logical ranks that the memory controller is operable to schedule to provide a one-to-one mapping between said logical ranks in the memory controller and said physical ranks; and
forwarding said request to one of the memory modules according to said mapping wherein said logical rank represents a memory system configuration as viewed by the memory controller and said logical rank appears as a logically larger ranked memory module than each of said individual physical ranks;
wherein said request to access memory utilizes a communication protocol different than used in a request received at the memory controller.

2. The method of claim 1 wherein the memory modules comprise dual inline memory modules and the number of ranks at the memory modules corresponds to the number of active chip selects.

3. The method of claim 1 wherein the memory modules comprise at least one logical memory module comprising two dual rank dual inline memory modules.

4. The method of claim 1 wherein the memory modules comprise at least one logical memory module comprising four single rank dual inline memory modules.

5. The method of claim 1 wherein the memory modules comprise at least one logical memory module comprising two single rank dual inline memory modules.

6. The method of claim 1 wherein the memory modules comprise two logical memory modules comprising four physical memory modules associated with one double data rate channel at the memory controller.

7. An apparatus comprising:
a rank aggregator for:
receiving from a memory controller, a request to access memory stored at memory modules, said request directed to one of a plurality of logical ranks and received over a double data rate channel;
mapping said logical rank to one of a plurality of physical ranks at the memory modules, wherein said physical ranks are combined into a largest number of said logical ranks that the memory controller is operable to schedule to provide a one-to-one mapping between said logical ranks in the memory controller and said physical ranks; and
forwarding said request to one of the memory modules according to said mapping;
interfaces for communication with the memory controller and the memory modules; and
memory at the rank aggregator for at least temporarily storing said mapping;
wherein said logical rank represents a memory system configuration as viewed by the memory controller and said logical rank appears as a logically larger ranked memory module than each of said individual physical ranks;
wherein said mapping comprises a static mapping configured for modification at boot-time.

8. The apparatus of claim 7 wherein the memory modules comprise dual inline memory modules and the number of ranks at the memory modules corresponds to the number of active chip selects.

9. The apparatus of claim 7 wherein the memory modules comprise at least one logical memory module comprising two dual rank dual inline memory modules.

10. The apparatus of claim 7 wherein the memory modules comprise at least one logical memory module comprising four single rank dual inline memory modules.

11. The apparatus of claim 7 wherein the memory modules comprise at least one logical memory module comprising two single rank dual inline memory modules.

12. The apparatus of claim 7 wherein the memory modules comprise two logical memory modules comprising four physical memory modules associated with one double data rate channel at the memory controller.

13. An apparatus comprising:
memory modules comprising a plurality of physical ranks;
a memory controller for transmitting a request to access memory at the memory modules, said request directed to one of a plurality of logical ranks and comprising a read or write command, and a memory address identifying a location of a set of memory cells, two or more of the memory modules combined to represent the number of logical ranks at the memory controller; and
a rank aggregator for mapping said logical rank to one of said physical ranks and forwarding said request to one of the memory modules according to said mapping, wherein said physical ranks are combined into a largest number of said logical ranks that the memory controller is operable to schedule to provide a one-to-one mapping between said logical ranks and said physical ranks;
wherein said logical rank represents a memory system configuration as viewed by the memory controller and said logical rank appears as a logically larger ranked memory module than each of said individual physical ranks; and
wherein said request to access memory utilizes a communication protocol different than used in a request received at the memory controller.

14. The apparatus of claim 13 wherein the memory modules comprise dual inline memory modules and the number of ranks at the memory modules corresponds to the number of active chip selects.

15. The apparatus of claim 13 wherein the memory modules comprise at least one logical memory module comprising two dual rank dual inline memory modules.

16. The apparatus of claim 13 wherein the memory modules comprise at least one logical memory module comprising four single rank dual inline memory modules.

17. The apparatus of claim 13 wherein the memory modules comprise at least one logical memory module comprising two single rank dual inline memory modules.

18. The apparatus of claim 13 wherein the memory modules comprise two logical memory modules comprising only four physical memory modules associated with one double data rate channel at the memory controller.

* * * * *